United States Patent [19]
Putnam et al.

[11] 4,115,869
[45] Sep. 19, 1978

[54] METHODS AND APPARATUS FOR PROCESSING DATA INCLUDING A CHARACTERISTIC MARK OR ERROR

[75] Inventors: Hubert P. Putnam, Orange; William O. Butts, Irvine, both of Calif.

[73] Assignee: Bell & Howell Company, Chicago, Ill.

[21] Appl. No.: 731,245

[22] Filed: Oct. 12, 1976

[51] Int. Cl.² ............................................... G06F 1/00
[52] U.S. Cl. ................................................... 364/900
[58] Field of Search ........................... 360/27, 40; 364/200 MS File, 900 MS File

[56] References Cited

U.S. PATENT DOCUMENTS

| | | | |
|---|---|---|---|
| 3,435,423 | 3/1969 | Fuller et al. | 364/900 |
| 3,571,807 | 3/1971 | Candy et al. | 364/900 |
| 3,641,503 | 2/1972 | Cullen | 364/900 |
| 3,815,102 | 6/1974 | Plunkett | 364/900 |

*Primary Examiner*—Raulfe B. Zache
*Attorney, Agent, or Firm*—Benoit Law Corporation

[57] ABSTRACT

Data including a recurring characteristic mark or error is stored at storage locations. A directory of specific locations of stored data including the characteristic mark or error is established. The processing of the stored data is controlled or the recurring error is eliminated with the aid of the established directory.

33 Claims, 2 Drawing Figures

Fig. 2

METHODS AND APPARATUS FOR PROCESSING DATA INCLUDING A CHARACTERISTIC MARK OR ERROR

BACKGROUND OF THE INVENTION

1. Field of the Invention

The subject invention relates to data processing and, more specifically, to the processing of data including a recurring characteristic mark or error which during further processing is to be acted on or eliminated.

2. Description of the Prior Art

Despite the rapid advance of electronic data processing and computer technology in recent years, there persists a need for a more rapid recognition of recurring characteristic marks or errors. For instance, a rapid recognition of delimiter marks is required in many instances where this is necessary to an identification of word or line lengths. Similarly, a rapid recognition of shift codes is required where data or its display is to be shifted during data processing. A rapid recognition of recurring errors is also required in error elimination routines.

By way of example, and not by way of limitation, reference may be had to computer output microfilm (COM) equipment. Most computer installations have many applications for which there is a very large printout to be used for reference purposes. Such printouts are bulky, take large storage space and are difficult to access. By the use of COM equipment, wherein data is displayed on a cathode ray tube (CRT) the screen of which is exposed to microfilm, a microfilm copy of the output either as a roll or as a microfiche is produced. The speed of recording is many times faster than printing and additional microfilm copies may be made at very low cost.

On the other hand, the attainable or potential rapid speed of recording requires a very rapid recognition of record marks which delimit each line, for a rapid line-by-line display of the output. By way of further example, a rapid recognition of shift marks is required for frequent shifts in the display between lower and upper case representation.

A similar need exists in applications wherein a recurring error is to be detected and rapidly eliminated.

So far the emphasis in the area under consideration has been on the improvement of programing or software. In brief, programs and software were perfected to effect a character-by-character search of processed data to detect characteristic marks therein. Upon detection of each mark, the particular data shifting process had to be interrupted so that the detected mark could be acted upon. The result was not only an extensive complication of the computer program, but also a significant reduction of the overall data processing speed because of the time required to effect the various subroutines and because of the delays brought about by the latter frequent interruptions.

SUMMARY OF THE INVENTION

It is a general object of this invention to overcome the above mentioned disadvantages.

It is a germane object of this invention to reduce the volume of software in data processing systems. It is a further germane object of this invention to provide novel hardware for data processing systems.

It is a further germane object of this invention to increase the speed of data processing.

It is also an object of this invention to provide improved computer output microfilm equipment.

It is also an object of this invention to provide improved apparatus and methods of processing data including a recurring characteristic mark.

It is a further object of this invention to provide improved methods and apparatus for processing data including a recurring error.

Other objects will become apparent in the further course of this disclosure.

From one aspect thereof, the subject invention resides in a method of processing data including a recurring characteristic mark and, more specifically, resides in the improvement comprising in combination the steps of storing the data at storage locations, establishing a directory of specific locations of stored data including the characteristic mark, processing the stored data, and controlling the processing with the aid of the established directory.

From a related aspect thereof, the subject invention resides in apparatus for processing data including a recurring characteristic mark and, more specifically, resides in the improvement comprising, in combination, first means including storage locations for storing the data, second means operatively associated with the first means for establishing a directory of specific locations of data stored in the first means including the characteristic mark, third means connected to the first means for processing the stored data, and fourth means connected to the second and third means for controlling the processing with the aid of the established directory.

From another aspect thereof, the subject invention resides in a method of processing data including a recurring characteristic mark and, more specifically, resides in the improvement comprising in combination the steps of storing the data and recurring characteristic mark at storage locations, establishing a directory of specific locations at which the recurring characteristic mark is stored, processing the stored data and recurring characteristic mark, and controlling the processing with the aid of the established directory.

From a related aspect thereof, the subject invention resides in apparatus for processing data including a recurring characteristic mark and, more specifically, resides in the improvement comprising, in combination, first means including storage locations for storing the data and recurring characteristic mark, second means operatively associated with the first means for establishing a directory of specific locations at which said recurring characteristic mark is stored, third means connected to the first means for processing the stored data, and fourth means connected to the second and third means for controlling the processing with the aid of the established directory.

From another aspect thereof, the subject invention resides in a method of processing data quanta characterized by delimiter marks and, more specifically, resides in the improvement comprising in combination the steps of storing the data quanta at storage locations, establishing a directory of specific locations of stored data quanta including the delimiter marks, retrieving the stored data quanta from the storage locations, and identifying the data quanta with the aid of the established directory.

From another aspect thereof, the subject invention resides in a method of processing data quanta characterized by delimiter marks and, more specifically, resides in the improvement comprising in combination the steps of storing the data quanta and delimiter marks at storage locations, establishing a directory of specific locations at which the delimiter marks are stored, retrieving the stored data quanta and delimiter marks from the storage locations, and identifying the data quanta with the aid of the established directory.

From another aspect thereof, the subject invention resides in a method of processing data including a recurring executive mark and, more specifically, resides in the improvement comprising in combination the steps of storing the data at storage locations, establishing a directory of specific locations of stored data including the recurring executive mark, processing the stored data, and controlling the processing with the aid of the established directory.

From another aspect thereof, the subject invention resides in a method of processing data including a recurring executive mark and, more specifically, resides in the improvement comprising in combination the steps of storing the data and recurring executive mark at storage locations, establishing a directory of specific locations at which the recurring executive mark is stored, processing the stored data, and controlling the processing with the aid of the established directory.

From yet another aspect thereof, the subject invention resides in a method of processing data including a recurring error and, more specifically, resides in the improvement comprising in combination the steps of storing the data including the recurring error at storage locations, establishing a directory of specific locations at which the recurring error is stored, processing the stored data, and eliminating the recurring error with the aid of the established directory.

From a related aspect thereof, the subject invention resides in apparatus for processing data including a recurring error and, more specifically, resides in the improvement comprising, in combination, first means including storage locations for storing the data including the recurring error, second means operatively associated with the first means for establishing a directory of specific locations at which the recurring error is stored, third means connected to the first and second means for eliminating the recurring error with the aid of the established directory.

BRIEF DESCRIPTION OF THE DRAWINGS

The subject invention and its aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
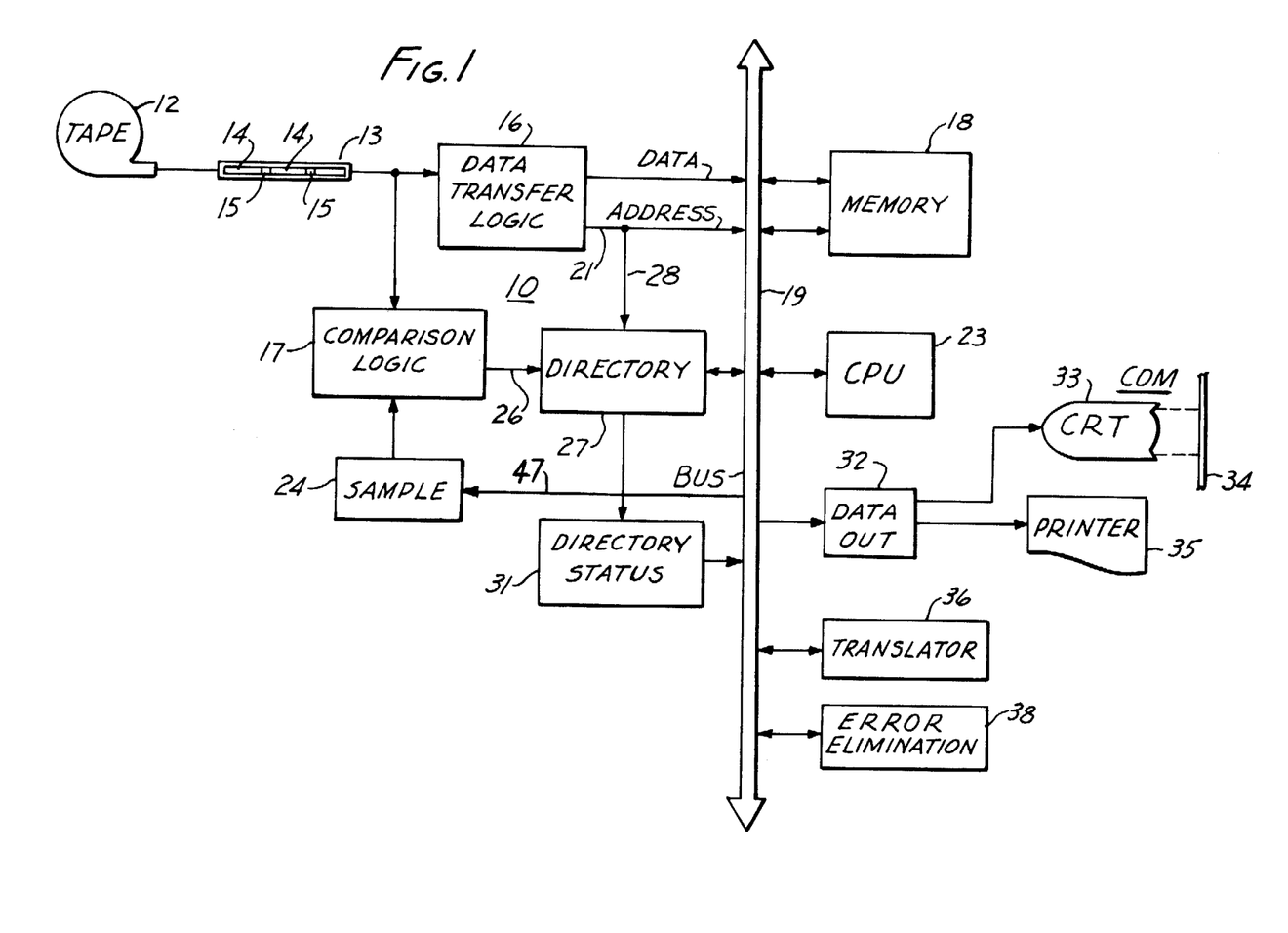
FIG. 1 is a block diagram of data processing equipment in accordance with a preferred embodiment of the subject invention.

The data processing equipment 10 shown in FIG. 1 is shown with a repository of data, such as a magnetic tape 12 or other data storage facility. A length of magnetic tape 13 or another data recording medium is symbolically shown in FIG. 1 as containing quanta 14 of recorded data including a recurring characteristic mark 15.

Data reproduced from the tape 12 is simultaneously applied to a data transfer logic 16 and to a comparison logic 17. The data transfer logic may be of a conventional type providing and applying the reproduced data to a data storage facility or memory 18 via a data bus 19, and for providing at an output 21 also the addresses of the stored data. The data processing equipment 10 further includes a central processing unit (CPU) for controlling the operation of the equipment. The CPU may be of a conventional type, including a primary memory for holding instructions to be executed and data to be used, an arithmetic unit, and a control unit for operating the system as directed by the instructions.

The data processing equipment 10 further includes a register facility 24 for providing and storing a sample of the characteristic mark or error to be detected.

The comparison logic 17 may also be of a conventional type for comparing the data including the recurring characteristic mark or error during transfer from the tape 12 to the data transfer logic 16 serially with the sample in the register facility 24 to detect the recurring characteristic mark or error.

Each time a characteristic mark or an error corresponding to the sample in the register facility 24 has been detected, the comparison logic 17 issues a comparison acknowledgment signal via a line 26 to a directory register facility 27. The facility 27 has an input connected via a line 28 to the address output 21 of the data transfer logic 16. The directory facility 27 thus receives the addresses provided by the data transfer logic 16 and, in response to each comparison acknowledgment signal received from the comparison logic 17 via the line 26, stores the address of the particular data which has matched the sample at 24.

For instance, if the sample at 24 is a recurring characteristic mark, then the directory register facility 27 would store the address of each such characteristic mark upon its detection by the comparison logic 17, until there has been established at 27 a directory of specific locations of data stored in the memory 18 including the particular specific mark.

On the other hand, if the sample at 24 is a sample of a recurring error, then the register facility 27 stores the address received via line 28 of each error detected by the comparison logic 17 and signaled via line 26.

The register facility 27 proceeds in this fashion as the comparison logic 17 serially compares the data transferred from the tape 16, until the register facility 27 contains a directory of specific locations at which the recurring error corresponding to the saple at 24 is stored in the memory 18.

In practice, the data or characters corresponding to the sample at 24 may or may not be stored in the memory 18. For instance, if the sample at 24 corresponds to a recurring characteristic mark, then that mark may itself be stored in the memory 18 and the directory facility 27 would then provide and store a directory of the specific locations or addresses of that stored recurring mark in the memory 18. On the other hand, the recurring characteristic mark, upon its detection by the comparison logic 17, may be deleted in the data transfer logic 16 and would in that case not be stored in the memory 18. The directory facility 27 would then provide a directory of specific locations or addresses of data stored in the memory 18 and pertaining to the recurring characteristic mark.

For instance, if the recurring characteristic mark is a line delimiter mark which signifies the end of each line to be displayed by the CRT of a COM, then it would in principle suffice for the directory facility 27 to provide a directory of storage locations or addresses containing the end of a line. Such a directory at 27 would then be equivalent to a directory of storage locations or addresses of delimiter marks in the memory 18 itself.

A delimiter or other characteristic mark may be associated with a data quantum comprised of a predetermined number of bits. These data quanta may, for instance, be words, bytes, or lines.

The hardware shown in FIG. 1 also includes a directory status facility or logic 31 connected to the directory 27 and to the bus 19 in order to inform the central processing unit 23 of the status of the directory 27. In particular, the directory status logic 31 enables the central processing unit 23 to inform itself whether there are addresses in the directory 27 at a particular time. If so, the central processing unit 23 would interrogate the directory 27 and obtain all directory information therefrom, until the directory status logic 31 would inform the central processing unit 23 that there is no more valid directory information stored at 27.

In a typical operation, the contents of the directory 27 are transferred to the memory portion of the central processing unit 23 for easier access. The central processing unit 23 then is able to control the transfer or further processing of information from the memory 18. Of course, whenever the directory status logic 31 indicates to the central processing unit 23 that no or no more directory information is stored at 27, the central processing unit 23 is free to institute or carry out another operating cycle.

By way of example, in the case of computer output microfilm display information reproduced from the tape 12 and transferred to the memory 18, the central processing unit 23 may cause such stored information to be transferred from the memory 18 via bus 19 to a data output facility 32 for display by a cathode ray tube 33 or other display facility which will permit the establishment of a computer output microfilm record on photographic film 34 or another appropriate pictorial information recording medium. Alternatively, or concurrently, the data output facility 32 may apply the information retrieved from the memory 18 to a data printer 35 for printout.

In either case, it is important for the data output facility 32 to determine when the CRT 33 or printer 35 has to switch in its display or printout from one line to the next. This phase of operation generally is handled with the aid of record or line delimiter marks which signify the end of each line to be displayed or printed out. Prior-art equipment and methodology were encumbered by a bottleneck at this juncture. In particular, the transfer of data from the memory 18 to the display or printout unit was impeded by the necessity of having to perform a character-by-character search for the specific tape code, such as a record mark. This required a considerable expansion of the software and thus significantly increased the expense of the program as well as the time consumption of its preparation and performance. It also significantly limited the efficiency of the hardware participating in the transfer function.

By solving the problem in the manner herein disclosed, the subject invention has provided a solution capable of relatively efficient hardware implementation with corresponding relief of the software, as desired in particular practical applications.

Of course, software may be made use of whenever desired in a given application, but such use would still preserve the relief of the software from the above mentioned character-by-character search during transfer of the data from the memory 18.

As further shown in FIG. 1, a translator 36, connected to the bus 19, may be employed for translating the data received from the memory 18 prior to their application to a data output or other facility operating in a different language or format. In that case, the principles of the subject invention may advantageously be employed to recognize characteristic marks in the data facilitating the operation of the translator 36. In this connection and also in a general sense, the term "executive mark" has been coined and is used herein to designate, for instance, an execution code which may modify the meaning of subsequent data, a shift code in the latter sense or a shift mark in the sense of an instruction that will cause the display or printout facility 33 or 35 to shift between upper and lower case display or printout. In addition or alternatively, the executive mark within the broad contemplation of the subject invention may also include a record mark or line delimiter mark of the type already described above, or any other mark causing execution of some predetermined function.

For instance, the equipment as shown in FIG. 1 may include an error elimination facility 38 connected to the data bus 19 for straining out errors, in a manner known per se, from data retrieved from the memory 18 prior to its application to display or printout equipment or prior to its further processing. In this respect it is known that many forms of data or data formats are apt to include errors of a recurring type, such as shift codes when no shifting is desired or characters that are forbidden in a given type of information or format. Of course, the error elimination facility 38 within the broad contemplation of the subject invention need not be taken literally but may also extend in its operation to equipment which eliminates recurring characters or marks that are not necessarily errors in the strict sense. For instance, if executive codes that are useful in one phase of the data processing operation are no longer needed in a subsequent phase, they may be eliminated at 38 as if they were errors. In that case, the facility 24 would again provide a sample of the character to be eliminated and the comparison logic 17 would cooperate with the facility 27 to establish a directory of that character so as to enable the central processing unit 23 to control the transfer of data from the memory 18 and the elimination thereof at 38 appropriately prior to the execution of the next data processing or display phase.

As in the case of executive marks, the directory 27, by noting the locations in the memory 18 at which the particular marks, errors or other characters to be eliminated are stored, and by making such information available to the central processing unit 23 or to another processing facility, obviates a character-by-character software search during the retrieval of data from the memory 18.

Figure 2:
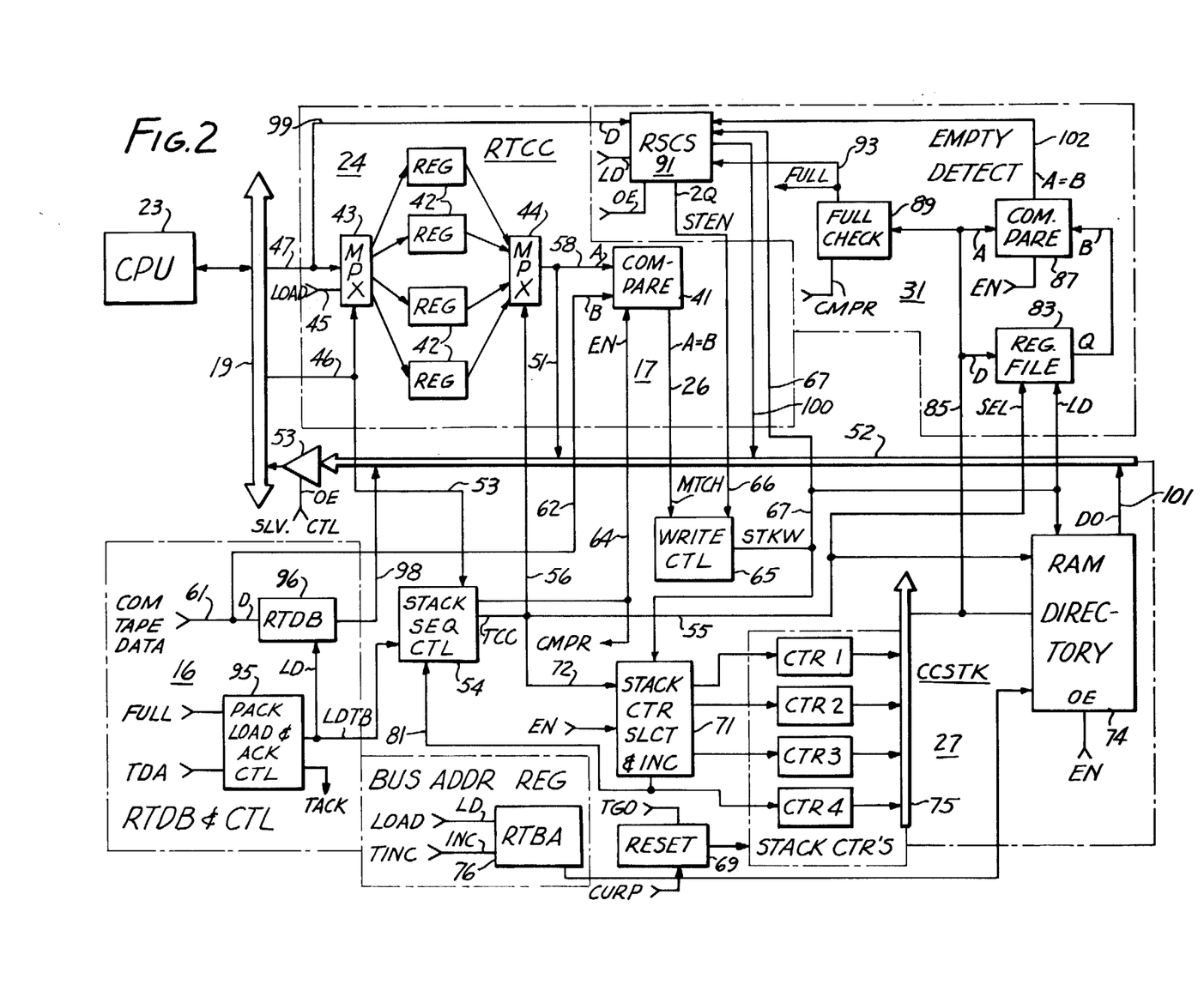
FIG. 2 is a functional block diagram of the data processing equipment shown in FIG. 1, in accordance with a further preferred embodiment of the subject invention.

Attention may now be directed to the block diagram of FIG. 2 wherein like reference numerals as among FIGS. 1 and 2 designate like or functionally equivalent parts and wherein a further preferred embodiment of the subject invention is shown.

In particular, the disclosure of FIG. 2 concentrates on the comparison logic 17, sample storage facility 24, directory 27, directory status logic 31 and related elements, without repeating a showing of such elements as the memory 18 and components 32, 33, 35, 36 and 38 shown and described in connection with FIG. 1.

According to FIG. 2, a Recorder Tape Code Comparison or RTCC facility includes the comparison logic 17 in the form of an $A = B$ comparator 41 which, for instance, may be a magnitude comparator of the type 74LS85 as described, for instance, on pages 202 to 207 of THE TTL DATA BOOK FOR DESIGN ENGINEERS, CC-411 (1973), by Texas Instruments Incorporated.

The RTCC also includes a sample register facility 24 including registers 42 which, for example, may be 4 by 4 register files with three-state output of the type 74LS670 described, for instance, on pages S-332 to S-337 of the Supplement (CC-416, 1974) of the above mentioned TTL DATA BOOK. The sample storage facility 24 further includes multiplexers 43 and 44 conventionally available for cooperation with and selection of any of the registers 42 in the same integrated circuit.

Through the slave control of the computer ("slave" referring to the reception of information from the CPU I/O bus 19), one or more of the registers 42 are loaded with the tape byte or character to be searched for. The registers 42 will be selected in this respect by the multiplexer receiving a load signal through an input 45 and an address through an address line 46, in addition to the sample bytes or characters via a line 47. Conventional bus interfacing equipment (not shown) may be employed between the bus 19 and the RTTC, as desired.

In this manner, one or more of the registers 42 are provided with a sample of the executive code, error or other character, typically of a recurring type, to be indexed in the directory 27. In this respect, it should be noted that more than one sample mark or character may be stored in the register facility 24 for selective indexing in the directory 27.

The samples are typically provided by the computer in response to one or more instructions. The samples may be verified or tested via an output line 51 tied to a tri-state data bus 52.

The tri-state data bus 52 is connectible to the CPU I/O bus 19 via a buffer or gating circuit 53 switchable by the slave control via an output enable or OE input.

The address information applied via the line 46 to the multiplexer 43 is also applied via a line 53 to a stack sequence control 54 in order to provide in a line 55 Tape Code Comparison or TCC signals for selecting the appropriate RTCC register 42 via a line 56 and the output multiplexer 44 connected thereto. By way of example, the stack sequence control 54 may comprise Dual J-K negative edge-triggered flip-flop-elements of the type 74LS112 as shown, for instance, on pages 81, 130 and 131 of the above mentioned TTL DATA BOOK.

The sample character thus provided is applied via an output line 58 to the A-input of the comparator 41. Simultaneously, data transferred from the tape 12 to the memory 18 (see FIG. 1) is also applied via lines 61 and 62 to the B-input of the comparator 51 which is enabled by a compare or CMPR signal applied by the stack sequence control 54 via a line 64 to the enable or EN input of the comparator.

Each time a data character transferred to the memory 18 matches the sample in the register facility 24, the comparator 41 assumes the condition $A = B$ and issues a match or MTCH signal via line 26 to a write control 65 which, by way of example may comprise a J-K flip-flop element of the above mentioned type 74LS112 having the match signal applied to its J-input and a stack enable signal applied via a line 66 to its clear input in order to provide a stack write or STKW pulse at its Q output and line 67. The stack enable or STEN pulse is provided by the directory status logic 31 in a manner more fully described in the further course of this disclosure.

The start of the tape read cycle with respect to the tape 12 is indicated by the tape Go signal TGO which will cause a reset logic 69 to reset stack counters CTR 1 to CTR 4. By way of example, these stack counters may comprise programmable binary counters of the type DM8556 shown, for instance, on pages 3-72 to 3-75 of the TTL DATA BOOK by National Semiconductor Corporation (February 1976).

The stack counters CTR 1 to CTR 4 are controlled by a stack control select and increment logic 71 which may comprise a Dual Decoder (2-line input to 4-output) of the type 74LS155 shown, for instance, on pages 313 to 316 of the above mentioned TTL DATA BOOK by Texas Instruments.

An enable pulse provided by the slave control is applied to the enable or EN input of the stack control 71. The above mentioned Tape Code Comparison or TCC signal, provided by the stack sequence control 54 is also applied via a line 72 to the A and B inputs of the stack control 71.

The above mentioned stack write or STKW signal is also applied via the line 67 to the $A_{IN}$ input of the stack control 71 in response to the above mentioned match (MTCH) and stack enable (STEN) pulses.

The stack control 71 selects the appropriate counter CTR and increments same. In the preferred embodiment shown in FIG. 2, four registers 42 and four stack counters CTR 1-4 are shown. This enables the use of four read and write memories or RAM's at 74 in the directory 27. By way of example, these RAM's may be Fully Decoded 256 × 4 Static N-Channel RAM elements of the type Am9101D shown, for instance, on pages 118 and 119 of the Product Catalog entitled "Outstanding Products" by Advanced Micro Devices, Inc.

The selected stack counter CTR is output into a tri-state bus 75 which selects the RAM address in the directory 74 to be loaded in case of a successful compare at 41. By way of example, the stack counters CTR may be 8-bit counters with only the six least significant bits being used to address the RAM in the directory 74.

The two most significant RAM address bits are then provided by the same TCC bits that selected the register 42 in the RTCC via line 56 and the stack counter CTR 1 to CTR 4 via line 72 and stack control 71.

The hardware shown in FIG. 2 includes a bus address register 76 which stores recorder tape bus addresses or RTBA. This is in accord with an advantageous feature of the illustrated preferred embodiment of the invention which employs bus addresses to index the desired executive mark or other character. The bus address register 76 is controlled by a load pulse from the slave control via an LD input and by a tape increment or TINC pulse from the master control via an INC input. By way of example, the address register 76 may be a programmable binary counter of the above mentioned type DM8556.

Whenever a match occurs as signified by the MTCH signal, the stack write or STKW signal, acting via line 67 on the stack counter 71 and RAM directory 74 will load all the bits of the recorder tape bus address (RTBA) into the RAM directory 74 at the selected RAM address.

The trailing edge of the stack write or STKW pulse increments the selected stack counter CTR 1 to CTR 4 to point to the next stack location in the RAM directory. The stack sequence control 54 will then update the TCC bits to output the second register 42 in the RTCC, to select the stack counter CTR 2, and to move the RAM address to correspond to the first word of the second Code Compare Stack (CCSTK) in the RAM directory 74. The entire sequence for selecting a register 42 in the RTCC, a stack counter CTR 1 to CTR 4, a RAM address, and testing equality of the sample to the COM tape data occurs identically for each of the four stacks CCSTK. After the fourth stack has been tested, the stack sequence control is reset via a line 81 and the code compare cycle for that tape byte is complete.

In summary, each time a match of a tape byte with a sample occurs, the recorder tape bus address (RTBA) is written into a selected RAM address section assigned in the directory 74. At the same time, that RAM address provided by the stack counter facility is loaded into a register file 83 in an Empty Detect section of the directory status logic 31. To this end, the stack write or STKW signal acts via line 67 not only on the RAM directory 74 but also on a load or LD input of the register file 83.

By way of example, the register file 83 may be a 4 × 4 register file of the above mentioned type 74LS670. In particular, all bits of the selected stack counter are loaded via a line 85 and a data or D input into the register file 83. The TCC signal from the stack sequence control 54 is applied to the select input of the register file 83. The Q output of the register file 83, in turn, is applied to the B-input of a comparator 87 which may be of the same type as the comparator 41, and which also receives an enable signal through an enable or EN input. The A-input of the comparator 87 receives the same information as the D-input of the register file 83 via line 85. The same applies to a full check logic 89 which, for instance, may comprise a J-K flip-flop element of the above mentioned type 74LS114.

The directory status logic 31 is completed by a recorder stack control and status register 91 which, by way of example, may comprise a Hex D flip-flop register of the type 74LS174 shown, for instance, at pages 363 to 368 of the above mentioned TTL DATA BOOK by Texas Instruments.

The RSCS register 91 at its 2Q output the above mentioned stack enable or STEN signal for the write control 65. The register 91 receives via a data or D-input, the information applied via line 47 to the registers 42. The register 91 also has a load or LD input and an output enable or OE input.

If any stack goes full by writing data into its highest location, the full bit of the RSCS register 91 is set via the full check logic 89 and line 93.

The resulting full signal is also applied to a corresponding input of a pack load and acknowledgment control 95. The pack load and acknowledgment control 95 and the Recorder Tape Data Bus or RTDB control including a register 96 belong to the data transfer logic 16 shown in FIG. 1.

In particular, the pack load and acknowledgment control 95 may be composed of Dual J-K negative edge-triggered flip-flop elements which may be of the above mentioned type 74LS112. This pack load and acknowledgment control receives a Tape Data Available or TDA signal from the COM tape unit and, in turn, supplies a Tape Acknowledge or TACK signal to the COM tape unit to acknowledge that COM tape data have been received. The pack load and acknowledgment control 95 further provide a Load Tape Buffer or LDTB signal to load the stack sequence control 54 and the RTDB register 96.

In particular, the COM TAPE DATA, that is the data reproduced from the tape 12 shown in FIG. 1, is applied via line 61 to the data input of the RTDB register 96, while being simultaneously applied via line 62 to the B input of the comparator 41 as described above. Under the control of the pack load and acknowledgment control 95, the RTDB register 96 passes the reproduced COM TAPE DATA via a line 98, a tri-state bus 52, gate 53 and CPU I/0 bus 19 to the memory 18 shown in FIG. 1 for storage and subsequent display, printout or other processing.

A FULL condition signaled by the directory status logic 31 will cause the pack load and acknowledgment control 95 to inhibit acceptance of any further data in the RTDB register 96. If more data is available at that juncture, a buffer backup condition will occur and stop the tape at the beginning of the block being read at the time.

By way of example, the RTDB register 96 may be a Quad D register with tri-state outputs of the type 74173 as shown, for instance, in the above mentioned TTL DATA BOOK by Texas Instruments, at pages 360 to 362.

An extension of the line 67 will apply the stack write or STKW signal also to the RSCS register 91 to indicate that the directory stack contains data. After each compare sequence, the stack sequence control 54 will output each stack counter into its own tri-state bus 75 and test the state of a predetermined bit of each stack counter to determine whether the particular stack is full.

This provides the FULL check which, as noted above, will inhibit acceptance of further data and appropriately stop the tape 12.

In this manner, there is established in the stacks 74 a directory of specific locations of stored data including the characteristic mark in the memory 18 or of specific locations at which the recurring characteristic mark, error or other predetermined character is stored in the memory 18.

When the tape read cycle is completed, a Control Unit Ready Pulse or CURP is applied to the reset logic 69 in order to reset all stack counters CTR 1 to CTR 4. This causes the stack counters to point to the first location in each stack in the RAM directory 74 for readout of these stacks on a first-in, first-out or FIFO basis. At that point, the empty detection or register file 83 contains the last stack counter address that was written for each stack, since that file was written into each time a match occurred to load a stack.

The stack read-out sequence may be done through the slave mode of the computer. The central processing unit 23 must first examine the recorder stack control and status register 91 to ascertain whether any data it wishes to interrogate was written into a stack at 74. At this juncture, it may be noted that a line 99 proceeds from the line 47 to the data input of the register 91 in order to permit the CPU to set up the stack enable or STEN condition.

Also, a line 100 proceeds from the RSCS register 91 to the tri-state bus 52 to permit interrogation of that register. A stack may be read if the corresponding stack data bit is set.

In order to interrogate the RAM directory 74, an enable pulse is applied to the output enable or OE input of the stacks at 74. The stacks are read out through a data output or DO line 101, tri-state bus 52, gate 53, and CPU I/0 bus 19 into the memory portion of the central processing unit 23.

A stack counter will then be output into its tri-state bus 27 to provide a RAM address for the particular stack. The previously mentioned enable signal at the OE input of the directory 74 then enables the RAM output and places the stack data for the specified stack on the output line 101 for transfer to the CPU.

The trailing edge of the enable signal will increment the selected stack counter to point to the next word to be read. While the enable signal is active, the selected stack counter output will be compared by the comparator 87 via line 85 with the last stack counter location that is stored in the empty detection or register file 83. If equality exists, an empty condition is present.

Accordingly, an empty signal, derived from the condition $A = B$, is applied via a line 102 to the RSCS register 91 to set the empty bit in that register. This indicates to the CPU 23 that the last word accessed was the last word written for that stack during the last tape read cycle.

The CPU may now interrogate another stack, if used, for its data. The stack counter will always point to the next location unless reset by another tape command or reset signal. The various stacks may be reread as many times as desired by resetting the stack counters and rereading until empty.

Data display, printout or other processing may thus proceed in the manner described or indicated above in connection with FIG. 1.

The subject extensive disclosure will suggest or render apparent to those skilled in the art various modifications and variations within the spirit and scope of the subject invention.

We claim:

1. In a method of processing data including a recurring characteristic mark, the improvement comprising in combination the steps of:
   storing said data at storage locations;
   establishing a directory of specific locations of stored data including said characteristic mark;
   processing said stored data; and
   controlling said processing with the aid of said directory.

2. A method as claimed in claim 1, wherein:
   said establishment of a directory includes the step of noting specific locations at which data including said recurring characteristic mark are stored.

3. A method as claimed in claim 1, wherein:
   said establishment of a directory includes the steps of providing a sample of said characteristic mark, comparing said data including said recurring characteristic mark prior to said storage serially with said sample to detect said recurring characteristic mark, and noting specific locations at which data including said recurring characteristic mark are stored.

4. In a method of processing data including a recurring characteristic mark, the improvement comprising in combination the steps of:
   storing said data and recurring characteristic mark at storage locations;
   establishing a directory of specific locations at which said recurring characteristic mark is stored;
   processing said stored data and recurring characteristic mark; and
   controlling said processing with the aid of said directory.

5. A method as claimed in claim 4, wherein:
   said establishment of a directory includes the step of noting specific locations at which said recurring characteristic mark is stored.

6. A method as claimed in claim 4, wherein:
   said establishment of a directory includes the steps of providing a sample of said characteristic mark, comparing said data including said recurring characteristic mark prior to said storage serially with said sample to detect said recurring characteristic mark, and noting specific locations at which said recurring characteristic mark is stored.

7. In a method of processing data quanta characterized by delimiter marks, comprising in combination the steps of:
   storing said data quanta at storage locations;
   establishing a directory of specific locations of stored data including said delimiter marks;
   retrieving said stored data quanta from said storage locations; and
   identifying said data quanta with the aid of said directory.

8. A method as claimed in claim 7, wherein:
   said establishment of a directory includes the step of noting specific locations at which data including said delimiter marks are stored.

9. A method as claimed in claim 7, wherein:
   said establishment of a directory includes the steps of providing a sample of said delimiter marks, comparing said data including said delimiter marks prior to said storage serially with said sample to detect said delimiter marks, and noting specific locations at which data including said delimiter marks are stored.

10. In a method of processing data quanta characterized by delimiter marks, comprising in combination the steps of:
    storing said data quanta and delimiter marks at storage locations;
    establishing a directory of specific locations at which said delimiter marks are stored;
    retrieving said stored data quanta and delimiter marks from said storage locations; and
    identifying said data quanta with the aid of said directory.

11. A method as claimed in claim 10, wherein:
    said establishment of a directory includes the step of noting specific locations at which said delimiter marks are stored.

12. A method as claimed in claim 10, wherein:
    said establishment of a directory includes the steps of providing a sample of said delimiter marks, comparing said data including said delimiter marks prior to said storage serially with said sample to detect said delimiter marks, and noting specific locations at which said delimiter marks are stored.

13. In a method of processing data including a recurring executive mark, the improvement comprising in combination the steps of:
    storing said data at storage locations;

establishing a directory of specific locations of stored data including said recurring executive mark;

processing said stored data; and controlling said processing with the aid of said directory.

14. A method as claimed in claim 13, wherein:

said establishment of a directory includes the step of noting specific locations at which data including said recurring executive mark are stored.

15. A method as claimed in claim 13, wherein:

said establishment of a directory includes the steps of providing a sample of said recurring executive mark, comparing said data including said recurring executive mark prior to said storage serially with said sample to detect said recurring executive mark, and noting specific locations at which data including said recurring executive mark are stored.

16. In a method of processing data including a recurring executive mark, the improvement comprising in combination the steps of:

storing said data and recurring executive mark at storage locations;

establishing a directory of specific locations at which said recurring executive mark is stored;

processing said stored data; and controlling said processing with the aid of said directory.

17. A method as claimed in claim 16, wherein:

said establishment of a directory includes the step of noting specific locations at which said recurring executive mark is stored.

18. A method as claimed in claim 16, wherein:

said establishment of a directory includes the steps of providing a sample of said recurring executive mark, comparing said data including said recurring executive mark prior to said storage serially with said sample to detect said recurring executive mark, and noting specific locations at which said recurring executive mark is stored.

19. In a method of processing data including a recurring error, the improvement comprising in combination the steps of:

storing said data including said recurring error at storage locations;

establishing a directory of specific locations at which said recurring error is stored;

processing said stored data; and eliminating said recurring error with the aid of said directory.

20. A method as claimed in claim 19, wherein:

said establishment of a directory includes the step of noting specific locations at which said recurring error is stored.

21. A method as claimed in claim 19, wherein:

said establishment of a directory includes the steps of providing a sample of said recurring error, comparing said data including said recurring error prior to said storage serially with said sample to detect said recurring error, and noting specific locations at which said recurring error is stored.

22. In apparatus for processing data including a recurring characteristic mark, the improvement comprising in combination:

first means including storage locations for storing said data;

second means operatively associated with said first means for establishing a directory of specific locations of data stored in said first means including said characteristic mark;

third means connected to said first means for processing said stored data; and fourth means connected to said second and third means for controlling said processing with the aid of said directory.

23. Apparatus as claimed in claim 22, wherein:

said second means include means for noting specific locations at which data including said recurring characteristic mark are stored in said first means.

24. Apparatus as claimed in claim 22, wherein:

said second means include means for providing a sample of said recurring characteristic mark, means connected to said sample providing means for comparing said data including said recurring characteristic mark serially with said sample to detect said recurring characteristic mark, and means for noting specific locations at which data including said recurring characteristic mark are stored in said first means.

25. Apparatus as claimed in claim 22, wherein:

said apparatus include a repository of said data including said recurring characteristic mark;

said apparatus further includes means for transferring said data including said recurring characteristic mark from said repository to said first means for storing said data; and said second means include means for providing a sample of said characteristic mark, means connected to said sample providing means for comparing said data including said recurring characteristic mark during said transfer serially with said sample to detect said recurring characteristic mark, and means for noting specific locations at which data including said recurring characteristic mark is stored in said first means.

26. In apparatus for processing data including a recurring characteristic mark, the improvement comprising in combination:

first means including storage locations for storing said data and recurring characteristic mark;

second means operatively associated with said first means for establishing a directory of specific locations at which said recurring characteristic mark is stored;

third means connected to said first means for processing said stored data; and fourth means connected to said second and third means for controlling said processing with the aid of said directory.

27. Apparatus as claimed in claim 26, wherein:

said second means include means for noting specific locations at which said recurring characteristic mark is stored in said first means.

28. Apparatus as claimed in claim 26, wherein:

said second means include means for providing a sample of said recurring characteristic mark, means connected to said sample providing means for comparing said data including said recurring characteristic mark serially with said sample to detect said recurring characteristic mark, and means for noting specific locations at which said recurring characteristic mark is stored in said first means.

29. Apparatus as claimed in claim 26, wherein:

said apparatus include a repository of said data including said recurring characteristic mark;

said apparatus further include means for transferring said data including said recurring characteristic mark from said repository to said first means for storing said data; and said second means include means for providing a sample of said characteristic mark, means connected to said sample providing means for comparing said data including said recurring characteristic mark during said transfer serially with said sample to detect said recurring characteristic mark, and means for noting specific locations at which said recurring characteristic mark is stored in said first means.

30. In apparatus for processing data including a recurring error, the improvement comprising in combination:

first means including storage locations for storing said data including said recurring error;

second means operatively associated with said first means for establishing a directory of specific locations at which said recurring error is stored;

third means connected to said first and second means for eliminating said recurring error with the aid of said directory.

31. Apparatus as claimed in claim 30, wherein:

said second means include means for noting specific locations at which said recurring error is stored.

32. Apparatus as claimed in claim 30, wherein:

said second means include means for providing a sample of said recurring error, means connected to said sample providing means for comparing said data including said recurring error serially with said sample to detect said recurring error, and means for noting specific locations at which said recurring error is stored.

33. Apparatus as claimed in claim 30, wherein:

said apparatus includes a repository of said data including said recurring error;

said apparatus further includes means for transferring said data including said recurring error from said repository to said first means for storing said data;

said second means include means for providing a sample of said recurring error, means connected to said sample providing means for comparing said data including said recurring error during said transfer serially with said sample to detect said recurring error, and means for noting specific locations at which said recurring error is stored.

* * * * *